(12) United States Patent
Morrison et al.

(10) Patent No.: US 11,826,638 B2
(45) Date of Patent: Nov. 28, 2023

(54) ADAPTIVE JOYSTICK HAVING A PIEZOELECTRIC BRAKE

(71) Applicant: Dell Products L.P., Round Rock, TX (US)

(72) Inventors: Jason Scott Morrison, Chadron, NE (US); Robert D. Hrehor, Jr., Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 17/647,715

(22) Filed: Jan. 11, 2022

(65) Prior Publication Data

US 2023/0218989 A1 Jul. 13, 2023

(51) Int. Cl.
*A63F 13/24* (2014.01)
(52) U.S. Cl.
CPC .................................. *A63F 13/24* (2014.09)

(58) Field of Classification Search
None
See application file for complete search history.

(56) References Cited

U.S. PATENT DOCUMENTS

2008/0036735 A1* 2/2008 Anastas ................. G06F 3/016
345/156
2020/0285305 A1* 9/2020 Navas-Roch ........ G09B 21/003

* cited by examiner

*Primary Examiner* — Peter J Iannuzzi
(74) *Attorney, Agent, or Firm* — Norton Rose Fulbright US LLP (57) ABSTRACT

This disclosure describes systems, devices, apparatuses, and methods of adjusting a resistance of user-input device. In particular configurations, the device includes a shaft configured to couple to a user element, such as a joystick, a brake coupled to the shaft at a planar element of the shaft, and a piezoelectric element coupled to the brake. The piezoelectric element may be configured to apply different forces to the brake to adjust a resistance to movement of the shaft by the user. Other aspects and features are also claimed and described.

20 Claims, 6 Drawing Sheets

ADAPTIVE JOYSTICK HAVING A PIEZOELECTRIC BRAKE

FIELD OF THE DISCLOSURE

The instant disclosure relates to user input devices and systems. More specifically, portions of this disclosure relate to adaptive joysticks for computer devices or other gaming systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. A user may interact with information handling systems through hardware components configured as user input devices and software configured to process input from the user input devices.

User input devices, including handheld videogame controllers, are used when operating various computer applications to enable users to provide input to operate various functions of the computer application. For example, a gaming controller can operate in conjunction with a gaming device to enable a user to provide input into an application, such as a video game, to control an object or character, select audio and/or video content, or otherwise control aspects related to the gaming device. Gaming controllers typically include multiple depressible buttons and one or more control sticks—which are able to be moved relative to a default position—that are controlled by a user to provide the input.

SUMMARY

According to embodiments of this disclosure, a gaming controller, or other user input device, may provide variable (e.g., adjustable and/or adaptive) feedback. Some embodiments include a controllable resistance mechanism (e.g., piezoelectric brake) that can be configured to selectively resist movement of a user element (e.g., a control stick, trackball, trigger, button, etc.) about an axis. The frequency and/or amplitude of a piezoelectric signal applied to a piezoelectric element can be adjusted to provide different haptic feedback at the user elements. The resistance applied by the controllable resistance mechanisms can be adjusted based on a user input, adjusted based on an input from a computer application, dynamically adjusted based on events occurring in an application (such as feedback from events in a gaming application), or a combination of these and other feedback controls. Some user input devices can include a processor configured as a controller to adjust the resistance in real-time, according to schedules, or on demand. Some user input devices can include an interface, wired and/or wireless, to receive commands to control the resistance in real-time, according to schedules, or on demand.

According to one embodiment, an apparatus may include a shaft configured to couple to a user element, wherein the shaft terminates in a planar element, a brake coupled to the planar element, and a piezoelectric element coupled to the brake, wherein the piezoelectric element is configured to apply different forces to the brake to adjust a resistance to movement of the shaft. The brake may comprise a first side comprising an inset inner surface and an outer surface, wherein the planar element is in contact with the brake at the outer surface. In some such embodiments, the inset inner surface comprises a larger portion of the first side of the brake than the outer surface.

Some embodiments of the apparatus can include a printed circuit board (PCB) coupled to the piezoelectric element and configured to couple a power supply to the piezoelectric element. Some embodiments of the apparatus can include a processor coupled to the PCB and configured to control a signal applied to the piezoelectric element to adjust the resistance to movement of the shaft. In some such embodiments, the processor is configured to adjust a frequency of a signal applied to the piezoelectric element to adjust the resistance to movement of the shaft. In some such embodiments, the processor is configured to apply haptic feedback to the shaft by controlling the signal applied to the piezoelectric element.

Some embodiments of the apparatus can include a sensor coupled to the PCB and coupled to the shaft, wherein the processor is configured to process a signal from the sensor corresponding to a movement of the shaft to determine user input. Some embodiments of the apparatus can include a housing and one or more isolators coupled to the housing. Some embodiments of the apparatus can include an adjustable element coupled to the PCB to apply a force to the PCB to compress the piezoelectric element against the brake. In some such embodiments, the adjustable element comprises a screw.

According to another embodiment, a user input device may comprise a housing defining a chamber configured to accommodate at least a portion of a first user element. In some such embodiments, the first user element extends through the housing. In some such embodiments, the at least one user element comprises a shaft terminating in a planar element, a brake coupled to the planar element, and a piezoelectric element coupled to the brake, wherein the piezoelectric element is configured to apply different forces to the brake to adjust a resistance to movement of the shaft. The user input device may further comprise a processor coupled to the first user element and configured to control a signal applied to the first user element to adjust the resistance to movement of the first user element.

In some embodiments, the first user element comprises a joystick, the device further comprising at least a second user element comprising a button. In some such embodiments, the second user element comprises a second shaft terminating in a second planar element, a second brake coupled to the second planar element, and a second piezoelectric element coupled to the second brake, wherein the second piezoelectric element is configured to apply different forces to the second brake to adjust a resistance to movement of the second shaft. In some such embodiments, the user input device further comprises an interface coupled to the processor, and the processor may be configured to transmit user input received through the first user element and/or the second user element to an information handling system.

Some embodiments of the user input device further comprise a PCB coupled to the piezoelectric element and an adjustable element coupled to the PCB to apply a force to the PCB to compress the piezoelectric element against the brake. In some such embodiments, the adjustable element comprises a screw. Some embodiments of the user input device further comprise a sensor coupled to the PCB and coupled to the shaft. In some such embodiments, the processor is configured to process a signal from the sensor corresponding to a movement of the shaft to determine user input. Some embodiments of the user input device further comprise a housing and one or more isolators coupled to the housing.

Some embodiments of the present disclosure may include a gaming system. The gaming system may include a gaming controller configured to transmit a plurality of signals (e.g., user input signals) to an information handling system. In some embodiments, the gaming controller can include an output shaft coupled at a first end to a user element (e.g., a control stick, trackball, trigger, button, etc.) that terminates at a second end in a planar element that is coupled to a brake. The brake may be coupled to a piezoelectric element that is configured to apply different forces to the brake to adjust a resistance to movement of the output shaft based on user input. The gaming controller may also include a processor configured to perform one or more operations with respect to the controller. As an example, the processor can be configured to receive an input and, based on the input, control (e.g., adjust a frequency and/or amplitude) a signal applied to the piezoelectric element to adjust the resistance to movement of the output shaft. Additionally, or alternatively, the processor can be configured to receive an input and, based on the input, apply haptic feedback to the output shaft by controlling the signal applied to the piezoelectric element. The input can be from a sensor coupled to the output shaft that provides a signal corresponding to a movement of the output shaft. Additionally, or alternatively, the input can be from an external source, such as the information handling system.

According to another embodiment, a method may include manufacturing or constructing the embodiments of the present disclosure, such as the described apparatuses, user input devices, joystick assemblies, gaming systems, or the like. In some embodiments, a method of assembling a user input device may comprise coupling a user element to a first end of a shaft, coupling a brake to a second end of the shaft, coupling a piezoelectric element to the brake, coupling a PCB to the piezoelectric element, coupling an adjustable element to the PCB, and adjusting the adjustable element to apply at least a predetermined force to the PCB to compress the piezoelectric element against the brake. In some embodiments of the method, the adjustable element comprises a screw. In some such embodiments, adjusting the adjustable element comprises rotating the screw to apply at least a predetermined force to the PCB to compress the piezoelectric element against the brake.

According to another embodiment, a method may include operating or otherwise using the embodiments of the present disclosure, such as the described apparatuses, user input devices, joystick assemblies, gaming systems, or the like. In some aspects, the method can include receiving feedback instruction from an information handling system and operating a user element (e.g., a control stick, trackball, trigger, button, etc.) based on the feedback instructions. In some embodiments, the method can include controlling a resistance applied to an output shaft coupled to a user element (e.g., a control stick, trackball, trigger, button, etc.) as the user element moves about an axis.

Another embodiment of the present disclosure includes receiving (such as over a wired, such as a USB cable, or wireless interface, such as Wi-Fi or Bluetooth connection), at a user element or controller of a user input device, a feedback instruction from an information handling system. The feedback instruction may include values for controlling feedback on an axis. A resistance mechanism on the axis may be adjusted based on adjustments to the frequency and/or amplitude of the piezoelectric input signal.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

User input devices with the adaptive user elements (e.g., control stick, trackball, trigger, button, etc.) to allow broad-spectrum frequency vibration, localized haptics at individual inputs, and adjustable resistance provide an improved user experience operating the user input device and interacting with an information handling system. For example, the adjustable resistance may allow more precise, subtle feedback effects by configuring the resistances for a particular application or scenario. In particular, the adjustable resistance may allow the selection of the intensity, type, and location of specific rumble effects conveyed to a user interacting with the user input device and/or the information handling system. In a gaming application, resistances to movement of a user element on an axis can be controlled by adjusting the frequency and/or amplitude of a piezoelectric input to more accurately simulate, for example, damage to an airplane aileron, elevator, rudder, etc., in a flight simulation.

Current control sticks for game controllers have been limited to "rumble" motors which cause the entire controller to vibrate in response to game events. In many gaming applications that utilize rumble motors, every game event or action yields the same amount of vibrational feedback, regardless of how much force a real-life equivalent of the game event or action might produce.

Shortcomings mentioned here are only representative and are included to highlight problems that the inventors have identified with respect to existing user input devices and interaction with information handling systems and sought to improve upon. Aspects of the devices and systems described below may address some or all of the shortcomings as well as others known in the art. Aspects of the devices and systems described below may present other benefits than, and be used in other applications than, those described herein.

Figure 1:
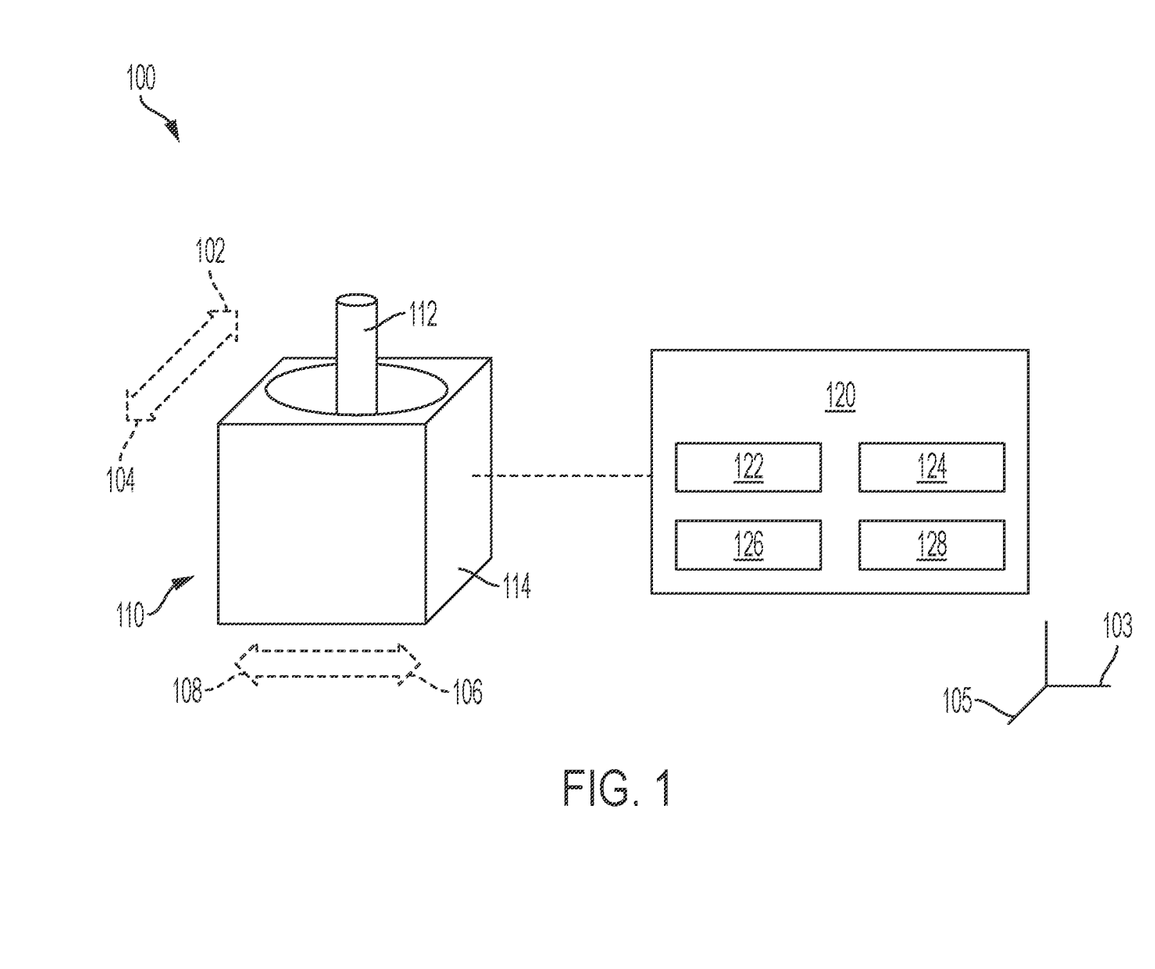
FIG. 1 is a schematic diagram of an example of a user input device according to one or more aspects of the present disclosure.

Referring now to FIG. 1, shown is an illustrative embodiment of a user input device 100. Device 100 includes a user element assembly 110 (e.g., control stick, joystick, analog stick, thumb stick, trackball, trigger, button, etc.) and a resistance mechanism 120 coupled to the user element and configured to selectively resist movement of the user element. In some embodiments, device 100 can be, but need not be, in communication with an information handling system (e.g., 480).

As shown in FIG. 1, user element assembly 110 includes a user element 112 (e.g., control stick, joystick, analog stick, thumb stick, trackball, trigger, button, etc.) that is moveable, relative to at least one other portion of the control stick assembly, in at least four directions, such as, for example a first direction 102, a second direction 104 that is opposite the first direction, a third direction 106, and a fourth direction 108 that is opposite the third direction (collectively, "the directions"). In some embodiments, user element 112 is rotatable about a plurality of axes. As shown in FIG. 1, user element 112 is rotatable about a first axis 103 (e.g., x-axis) and a second axis 105 (e.g., y-axis) to move in the directions. For example, in some embodiments, user element 112 may include a 2-axis gimbal that is rotatable about first axis 103 to move in first and second directions 102, 104 and rotatable about second axis 105 to move in third and fourth directions 106, 108. User element 112 may be biased toward a default position (e.g., center position) and return to the default position when a force is removed from the user element. Although FIG. 1 depicts user element 112 as being disposed within a housing 114, in other embodiments, the user element can be coupled to a base or other portion of user element assembly 110 while still achieving the functionality described herein. Additionally, or alternatively, user element assembly 110 may include one or more additional components, such as a housing, a button, thumb cap, one or more sensors (e.g., positions sensors, magnetic sensors), circuitry, or the like.

Device 100 includes one or more resistance mechanisms 120 coupled to user element assembly 110 in such a manner as to resist movement of user element 112. As an illustrative example, resistance mechanism 120 may be coupled to user element assembly 110 via gears, bands, or other power transmission system. Each resistance mechanism 120 may include a brake 122 (e.g., piezoelectric brake), a processor 124, and, in some embodiments, a memory 126. Each of brake 122, processor 124, and memory 126 can be in electrical communication with one another. In some embodiments, resistance mechanism 120 includes, or is coupled to, a power source 128 (e.g., a battery, capacitors, a charge storage device, or the like) that is configured to provide electrical current to one or more components of the resistance mechanism.

User element 112 may rotate about first axis 103, second axis 105, or both. Brake 122 is coupled to user element assembly 110 and configured to provide resistance to user element 112 as it moves in at least one of the directions. To further illustrate with respect to first axis 103, brake 122 may provide resistance in a clockwise rotation (e.g., as user element 112 moves in first direction 102), counter clockwise rotation (e.g., as user element 112 moves in second direction 104), or both. In some embodiments, brake 122 includes a piezoelectric brake. In such embodiments, a piezoelectric element coupled to brake 122 may be actuated from a non-energized state to an energized state to increase a resistance of the brake. In some embodiments, piezoelectric element coupled to brake 122 may be further adjusted in the energized state to further control (e.g., maintain, increase, or decrease) the resistance of the brake. In this way, a resistance, or other damping characteristics, of a brake (e.g., 122) may be controlled by varying a frequency or amplitude of electrical signal that is applied to the piezoelectric. In some such embodiments, piezoelectric element of the brake 122 is further coupled to a power source, and an electrical current can be varied to control a resistance of the brake 122.

Processor 124 may be a central processing unit (CPU), microcontroller a field-programmable gate array (FPGA) device, an application-specific integrated circuits (ASIC), another hardware device, a firmware device, other computing circuitry or any combination thereof. Memory 126 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 126 may store data, such as joystick position data (e.g., a relative distance between an active position and the default position), resistance data, game embodiment data (e.g., data or instructions from an external gaming device), or the like. Additionally, or alternatively, memory 126 may store one or more thresholds such as positional thresholds, rotation thresholds, resistance thresholds, or the like.

Memory 126 may also store instructions that, when executed by processor 124, cause the processor to perform one or more operations with the user input devices (e.g., 100), as described herein. For example, processor 124 may be configured to adjust a resistance that brake 122 applies to user element 112 as the user element moves away from the default position (e.g., in the first, second, third, or fourth directions). In a specific, non-illustrative embodiment, processor 124 is configured to cause brake 122 to exert a first resistance while user element 112 rotates about the first axis and exert a second resistance while the user element rotates about the first axis, the second resistance being different (e.g., greater or less than) the first resistance. In some embodiments, processor 124 may be configured to adjust a resistance of brake 122 based on an input signal, such as a signal from a user input, an external gaming device, or the like. For example, a user may select the resistance of brake 122 based on the user's preference. As another example, an external gaming device may select the resistance based on a gaming event (e.g., increased resistance as a controllable character interacts with an obstacle). It should be understood that memory 126 may be configured to store other instructions, thresholds, or data sets that are not explicitly described herein.

User input device 100 is capable of being adjustable according to the preferences of a user, a gaming developer, or the like. Further, device 100 can provide additional feedback that cannot be performed by traditional input devices. For example, the intensity, type, and location of specific effects, or a combination thereof, can be precisely adjusted. Thus, device 100 may provide an enhanced user experience compared to traditional input devices. For example, device 100 may selectively resist rotation of a user element (e.g., 112) about a first axis, a second axis, or both. In some such embodiments, this resistance may be adjusted in real time based on a user input, an input from a computer application, or both, as further described herein. In this way, individual game events or actions can be perceived differently by a user depending on the mechanical motion and resistance thereto of the user element.

Figure 2A:
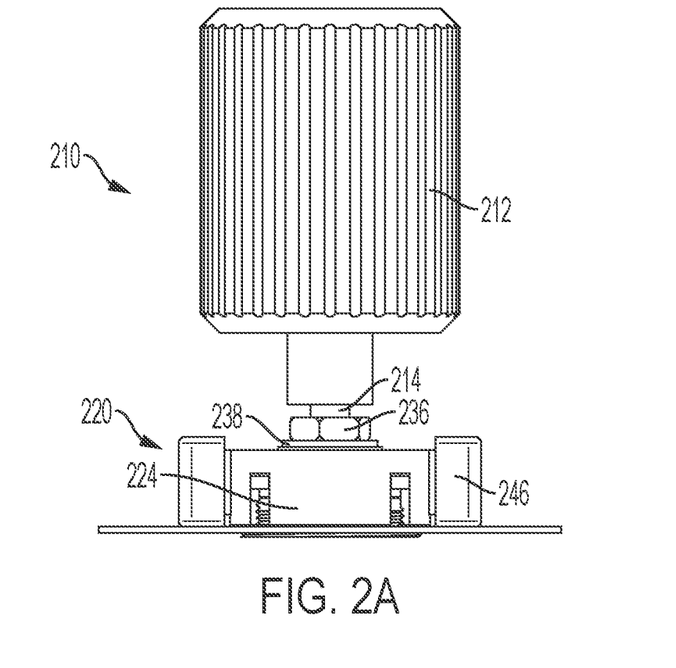
FIG. 2A is a front view of another example of a user input device according to one or more aspects of the present disclosure.
Figure 2B:
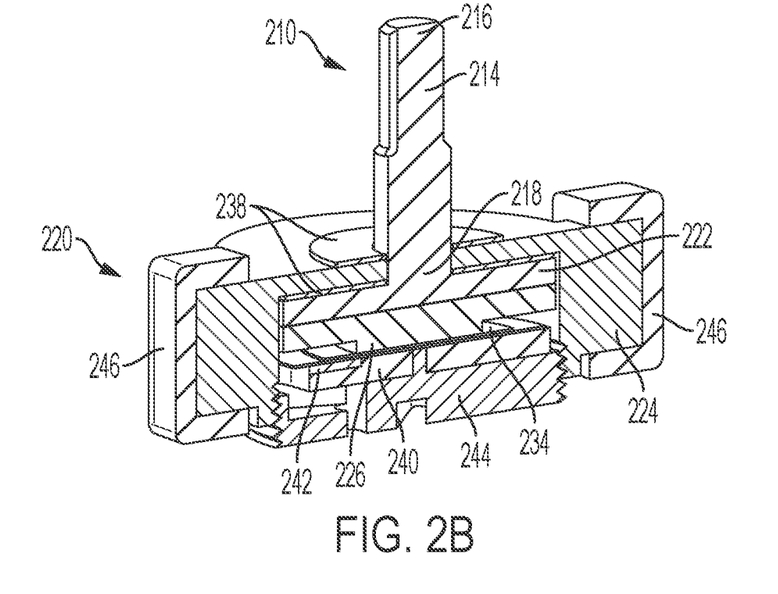
FIG. 2B is a perspective sectional view of the user input device of FIG. 2A.
Figure 3:
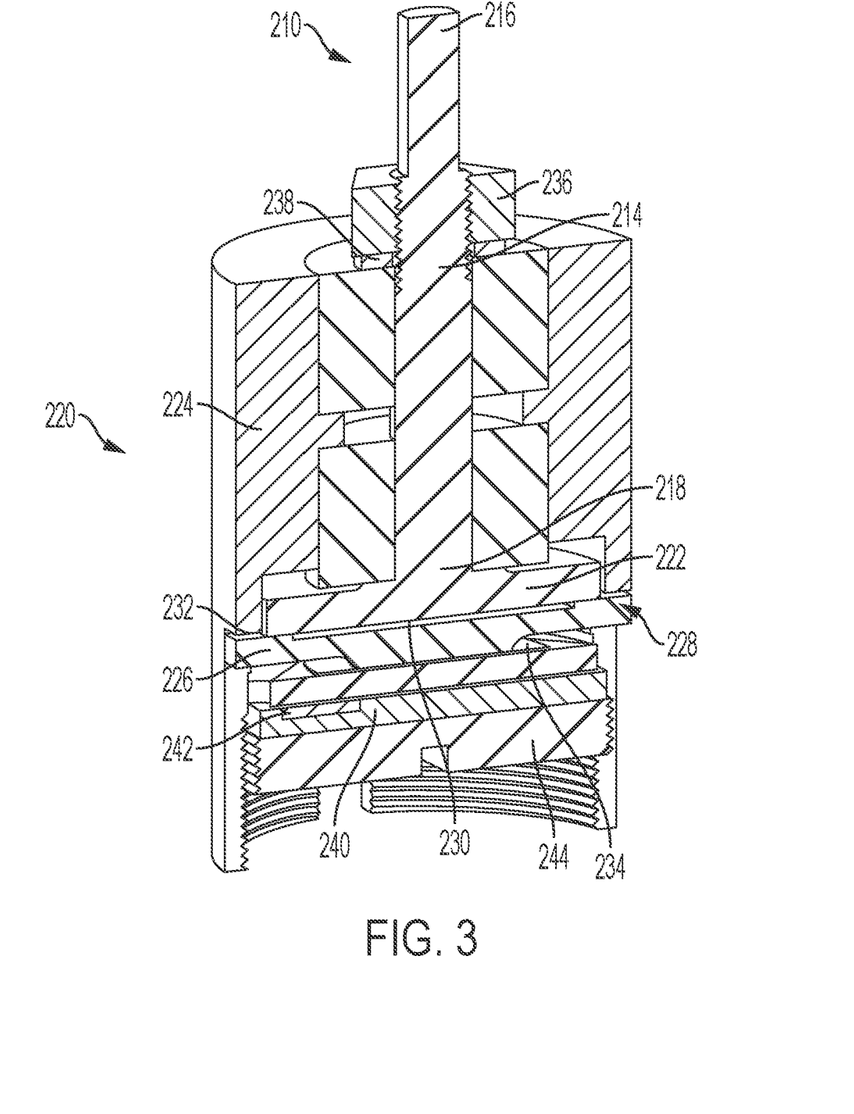
FIG. 3 is a perspective sectional view of another example of a user input device according to one or more aspects of the present disclosure.

Referring to FIGS. 2A-B and FIG. 3, views of an example of a user input device 200 (device 200) are shown illustrating a manner of coupling a piezoelectric brake to a user element. For example, FIGS. 2A and 2B show front and perspective sectional views, respectively, of an example of device 200; and FIG. 3 shows a perspective sectional view of another example of device 200. Device 200 includes a user element assembly 210 and a resistance mechanism 220. Device 200 and user element assembly 210 may include or correspond to device 100 and user element assembly 110, respectively. Additionally, or alternatively, resistance mechanism 220 may include or correspond to resistance mechanism 120. One or more user input devices 200 may be included in a user interface (e.g., a controller) (e.g., 460). For example, a user interface may include 1, 2, 3, 4, 5, 6, 7, 8, 9, 10, or more user input devices 200, each user input device 200 including a user element assembly 210 and a resistance mechanism 220. The user interface may be coupled to a processor (e.g., 124), and the processor may be configured to transmit user input received through the user elements to an information handling system.

Each user element assembly 210 includes a user element 212 and a shaft or post 214 that is configured to rotate about one or more axes from a default position. User element 212 may be, for example, a control stick, joystick, analog stick, thumb stick, trackball, trigger, button, etc. User element 212 may be coupled to shaft 214 at a first end 216 of shaft 214. Shaft 214 can include a single, unitary component or may include multiple components coupled together to form user element 212. In some embodiments, user element 212 includes one or more biasing members, such as a compression spring, that is configured to bias the user element to the default position. In some such embodiments, the spring may be compressed when user element 212 is rotated from the default position, and may thereby provide a resistance or centering tension that is felt by the user. In this way, the biasing member (e.g., spring) may actively apply a centering force to user element 212 to move the user element back to the default position. In some embodiments, the biasing member can be adjusted to increase or decrease the centering tension that acts on user element 212. For example, in embodiments in which the biasing member includes the spring, a compression of the spring may be increased to provide a greater centering tension.

Shaft or post 214 of each user element assembly 210 can terminate at a second end 218 at a planar element 222. In some embodiments, shaft or post 214 and/or planar element 222 of user element assembly 210 are partially disposed within a housing 224 in which resistance mechanism 220 is disposed. In other embodiments, shaft or post 214 and/or planar element 222 of user element assembly 210 are entirely disposed within housing 224 in which resistance mechanism 220 is disposed. In other embodiments, planar element 222 of user element assembly 210 can be coupled to a base or other portion of user element assembly 210 while still achieving the functionality described herein.

User element assembly 210 may be coupled to housing 224 using any suitable fasteners, e.g., anchors, bolts, hardware, nails, nuts, pins, clips, rivets, rods, screws, sockets, clamps, hangers, washers, or a combination thereof, in any configuration suitable to releasably couple piezoelectric element 234 to brake 226. Movement of the shaft 214 is resisted by its rotation relative to the brake 226. The piezoelectric element 234 and brake 226 may not rotate relative to each other. For example, in the embodiment shown in FIGS. 2 and 3, user element assembly 210 is threadably coupled to housing 224 via nut 236 and washers 238 (e.g., 238*a* and 238*b*). Nut 236 and washers 238 may comprise any suitable material, including but not limited to metal (e.g., aluminum, steel, zinc alloy, etc.) or plastic (e.g., polytetrafluoroethylene, nylon, acetal, polycarbonate, polypropylene, polyethermide, acrylonititrile-butadine-styrene, polyethylene, poly vinyl chloride, polyurethane, polyvinylidene fluoride, polychlorotrifluoroethylene, FR-4/G10 plastic, polyarylamide, polyether ether ketone, polyphthalamide, etc.). In specific embodiments, washers 238 are comprised of polytetrafluoroethylene, and polytetrafluoroethylene washers 238 can decrease friction between user element assembly 210 and housing 224.

Referring to FIG. 2B and FIG. 3, each resistance mechanism 220 of user input device 200 includes a brake 226 configured to contact planar element 222. Brake 226 may be comprised of any material suitable for generating friction upon contact with planar element 222 and may include, but is not limited to, glass, rubber, resin, ceramic, iron, copper, steel, graphite, or a combination of any one or more of these materials. As shown in FIG. 3, in some embodiments, brake 226 includes a first side 228 comprising an inset inner surface 230 and an outer surface 232. In such embodiments, planar element 222 of user element assembly 210 is in contact with brake 226 at outer surface 232. In specific embodiments, planar element 222 of user element assembly 210 contacts brake 226 only at outer surface 232. In some embodiments, inset inner surface 230 comprises a larger portion of first side 228 of brake 226 than the surface 232. For example, in some embodiments, inset inner surface 230 can comprise between 51% and 99%, e.g., greater than or equal to any one of, or between any two of, 55%, 60%, 65%, 70%, 75%, 80%, 85%, 90%, or 95%, of first side 228 of brake 226. In some embodiments, contact (e.g., friction) between planar element 222 of user element assembly 210 and outer surface 232 of first side of brake 226 can maximize rotational torque of user element assembly 210 with respect to resistance mechanism 220. The brake 226 may thus be thicker in some embodiments at the outer diameter such that the brake 226 contacts the disk part (e.g., planar element) of the shaft 214 only at the outer diameter. This may maximize the torque applied by brake 226 because the friction force is applied at a bigger radius (longer moment arm). With some piezoelectric materials, the piezo may dome up in the center so the brake 226 only contacts the piezo at the center. The brake 226 may be a flat plate in some embodiments, but may take other shapes in other embodiments.

Referring still to FIG. 2B and FIG. 3, each resistance mechanism 220 can further include a piezoelectric element 234 coupled to brake 226. The element 234 may be coupled to brake 226, similar to a clutch, except instead of a static spring, the element 234 pushes the plates together. Piezoelectric element 234 may be comprised of any suitable material, including but not limited to single-crystal materials (e.g., quartz, langasite, gallium orthophosphate, lithium niobate, lithium tantalite, bernlinite, Rochelle salt, topaz, tourmaline, macedonite, etc.), piezoceramics (e.g., barium titanate, lead zirconate titanate, potassium niobate, sodium tungstate, barium sodium niobate, lead potassium niobate, zinc oxide, sodium potassium niobate, bismuth ferrite, sodium niobate, bismuth titanate, sodium bismuth titanate, etc.), piezopolymers (e.g., polyvinylidene difluoride (PVDF), PVDF-trifluoroethylene copolymer, polyamide, parylene-C, polyimide, polyvinylidene chloride, etc.), piezocomposites, and piezofilms (e.g., zinc oxide, aluminum nitride, lead zirconate titanate, etc.).

In some embodiments, piezoelectric element 234 of resistance mechanism 220 is configured to apply different forces to brake 226 to adjust a resistance to movement of shaft 214. For example, resistance mechanism 220 may further include a printed circuit board ("PCB") 240 coupled to piezoelectric element 234. Although not shown, additional electronic components (e.g., power source, processors, memory storage, transistors, resistors, graphics cards, integrated circuits, or other circuitry or hardware) may be coupled to PCB 240 and can be electrically connected to device 200 via the PCB.

PCB 240 may couple a power supply (e.g., 128) (e.g., a battery, capacitors, a charge storage device, or the like) to piezoelectric element 234. Electrical coupling between piezoelectric element 234 and the power supply may be controlled by a processor (e.g., 124) coupled to PCB 240, and control of the electrical coupling between piezoelectric element 234 and the power supply can control resistance of brake 226. In some embodiments, piezoelectric element 234 is configured to have a geometric deformation proportional to an electric voltage applied to the piezoelectric element 234 (such as by applying a current from the power supply). In such configurations, the processor is configured to vary the electric voltage/current to control an intensity of the geometric deformation of piezoelectric element 234, and thereby the resistance of brake 226 against movement of the shaft 214. In particular, when piezoelectric element 234 is subjected to a voltage potential input signal delivered by the power supply, piezoelectric element 234 undergoes a geometric deformation (e.g., changes in shape). Geometric deformation of piezoelectric element 234 forces brake 226 coupled to piezoelectric element 234 to move into contact with planar element 222 of user element 212, resulting in a friction force resisting rotation of user element assembly 210.

By adjusting a resistance (e.g., resistance torque) of brake 226 via adjustments to the frequency and/or amplitude of the electrical signal applied to piezoelectric element 234, the processor may adjust a resistance of user element 212 as a user moves the user element in one or more directions. For example, the processor may control (e.g., increase or decrease) a resistance of brake 226 based on the direction of rotation (e.g., counter-clockwise) such that a resistance is applied to user element 212 only when the user element moves in a certain direction. In a specific, non-limiting example, the processor can increase a magnitude of a voltage potential input applied to piezoelectric element 234 from a first intensity to a second intensity based on a movement of user element 212 in a first direction and decrease the intensity of the voltage potential (e.g., to the first intensity, turn off power supply, or the like) based on movement of the user element in a second direction. In another example, the processor may adjust a resistance of user element 212 based on positional information of brake 226 or user element 212.

In this way, the amount of friction force applied by brake 226 to user element assembly 210 can be changed quickly and accurately, in part because the piezoelectric element 234 responds quickly to changes in applied voltages. Adjustment of friction force applied by brake 226 to user element assembly 210 via adjustments to the frequency and/or amplitude of the electrical signal applied to piezoelectric element 234 by the processor may also result in application of haptic feedback to user element assembly 210. For example, the processor may control adjustment of the amount of friction generated between planar element 222 and brake 226 to generate different haptic feedback, such as vibration, shakes, or rumbles, at user element 212 corresponding to game events (e.g., explosions) or actions (e.g., firing a weapon) happening in a gaming application.

As described herein, device 200 may be configured to adjust a user element resistance in any of three hundred and sixty (360) degrees. Each resistance mechanism 220 may be configured to apply a passive resistance force to user element 212, as compared to the active centering force applied by a biasing member (e.g., via a spring). Such configurations allow for a selective resistance force (e.g., selected by a user, a gaming developer, or the like) that can be adjusted based on multiple factors to enable a more immersive and controllable gaming experience.

Referring again to FIG. 2B and FIG. 3, each resistance mechanism 220 of user input device 200 may also include at least one sensor 242 (e.g., 1, 2, 3, or more sensors). Sensor 242 may be coupled to PCB 240. Sensor(s) 242 may also be coupled to user element assembly 210 (e.g., user element 212, shaft 214, and/or planar element 222). Sensor 242 may be configured to determine a position of brake 226, user element 212, or combination thereof. As an example, sensor 242 is configured to determine a difference between a current position of brake 226 and a default position. In some such configurations, a processor (e.g., 124) may then determine positional information of user element 212 based on the rotational position of brake 226 in response to user input.

As shown in FIG. 2B and FIG. 3, each resistance mechanism of user input device 200 may further include an adjustable element 244. Adjustable element 244 may be configured to apply a force to PCB 240 to compress piezoelectric element 234 against brake 226. Adjustable element 244 may be coupled to PCB 240 and/or housing 224. Adjustable element 244 may be any suitable fastener, e.g., anchor, bolt, hardware, nail, nut, pin, clip, rivet, rod, screw, socket, clamp, hanger, washer, or a combination thereof, in any configuration suitable to adjustably couple adjustable element 244 to PCB 240 and housing 224. For example, in the embodiment shown in FIGS. 2B and 3, adjustable element 244 comprises a screw, and adjustable element 244 is threadably coupled to housing 224 to apply a force to PCB 240 to compress piezoelectric element 234 against brake 226.

Referring to FIG. 2, each resistance mechanism of user input device 200 may further include one or more isolators 246. Isolators 246 may be configured to decrease or prevent haptic feedback, such as vibration, shakes, or rumbles, at user element 212 corresponding to game events (e.g., explosions) or actions (e.g., firing a weapon) happening in a gaming application, from transferring from one component or material to another by stiffening or absorbing the vibratory forces produced according to the haptic feedback. For example, isolators 246 may comprise any material suitable for absorption of vibratory stress (e.g., rubber, polyurethane, polyvinyl chloride, etc.) and may prevent haptic feedback from transferring from a first user element assembly 210 to another user element assembly. In specific embodiments, isolators 246 are rubber.

Figure 4A:
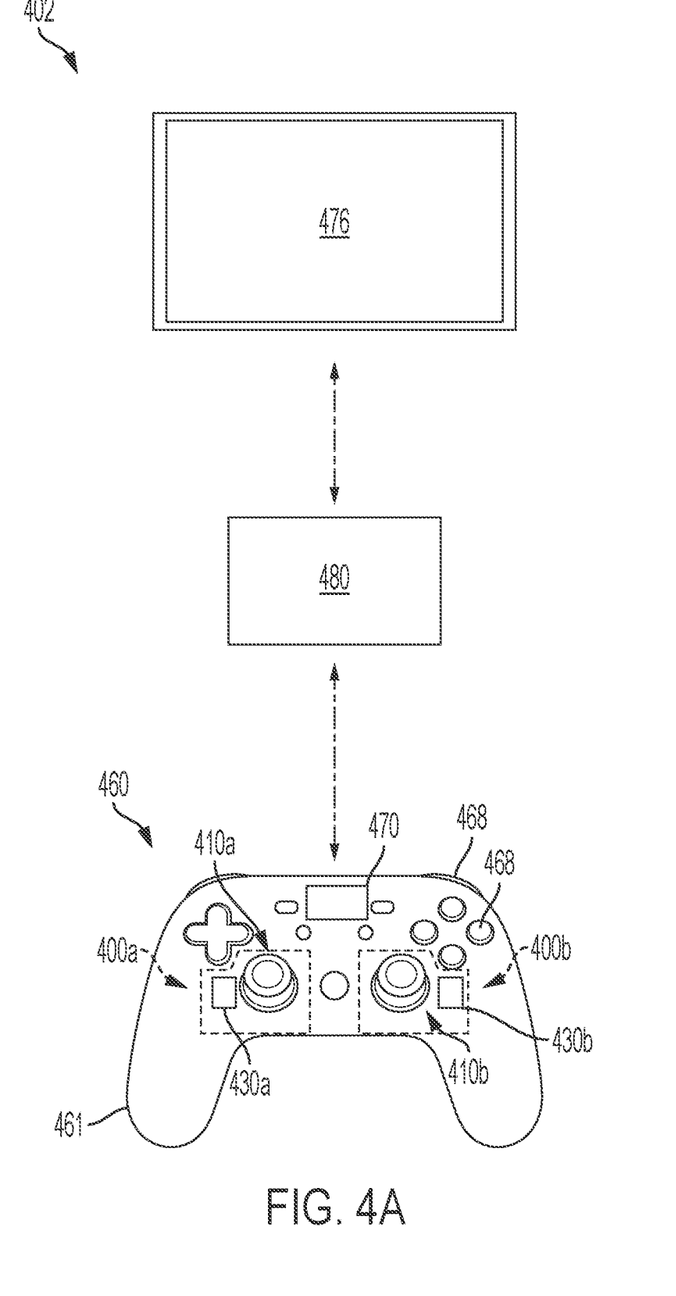
FIG. 4A is a schematic diagram of an example of a system that includes a user input device according to one or more aspects of the present disclosure.
Figure 4B:
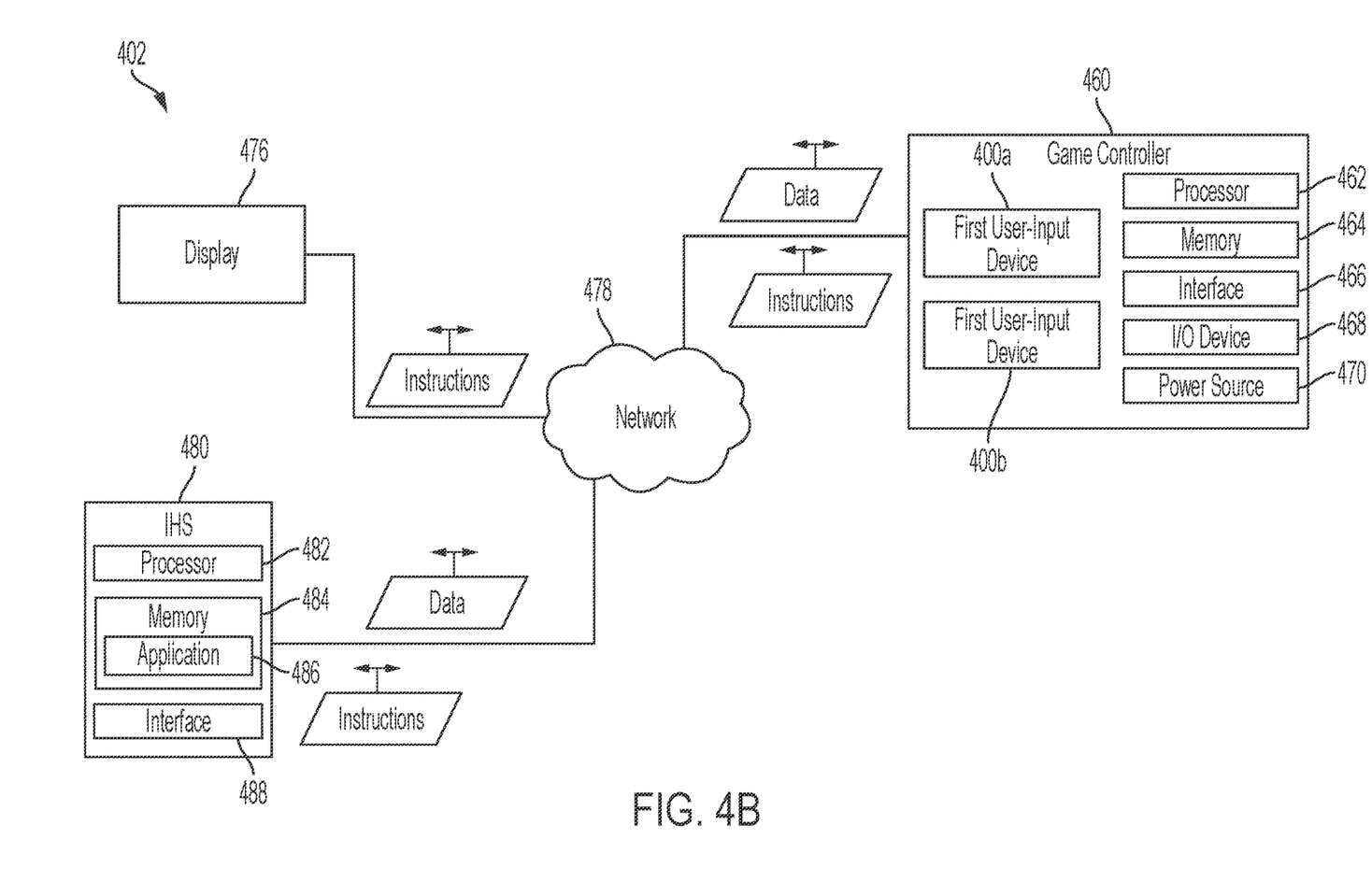
FIG. 4B is a block diagram of an example of the system of FIG. 4A

Referring now to FIGS. 4A and 4B, shown is a system 402 including a user-input device (e.g., 400a, 400b). System 402 includes one or more controllers 460, a display 476, and one or more information handling systems (IHS) 480 (e.g., video game console, entertainment console, or other multimedia device) configured to execute one or more electronic applications (e.g., video games). In some embodiments, the IHS 480 executing applications may be integrated with the display 476. In some configurations, display 476 and IHS 480 can be integrated with controller 460 as part of a mobile computing system or other information handling system such that the applications are executed at the controller 460.

Controller 460 is in communication with IHS 480 (e.g., wired or wireless communication) and is configured to send and receive signals to and from the information handling system to navigate or otherwise control the electronic applications. For example, as shown in FIG. 4A, controller 460 is a video game controller, IHS 480 is a gaming console, and display 476 is a television. In some such embodiments, the various devices of system 402 (e.g., controller 460, IHS 480, and display 476) may be communicatively coupled to each other via one or more networks 478 (e.g., a Bluetooth protocol, an Ethernet protocol, a transmission control protocol/internet protocol (TCP/IP), an Institute of Electrical and Electronics Engineers (IEEE) 802.11 protocol (WiFi), or other protocol). In other embodiments, display 476 and IHS 480 can be integrated with controller 460 such that the electronic applications are operated at the controller.

Controller 460 can include a controller casing 461 (e.g., shell) that defines an interior cavity that is configured to at least partially accommodate a first user-input device 400a and a second user-input device 400b, a third user-input device 468, or more. First user-input device 400a and second user-input device 400b may include or correspond to device 100 or 200. For example, in the embodiment shown in FIG. 4A, first user-input device 400a includes a joystick user element assembly 410a coupled to a resistance mechanism 430a and second user input device 400b includes a second joystick user element assembly 410b coupled to a resistance mechanism 430b. Joystick user element assemblies 410a and 410b extend from controller casing 461 and are configured to manipulate by a user. A user may operate (e.g., rotate) the first and second device 400a, 400b, as described herein, to provide input to an application executing on the IHS 480.

As shown in FIG. 4B, controller 460 may include processor 462, a memory 464, an interface 466, an input/output (I/O) device 468, a power source 470, or combination thereof. The controller 460 in FIGS. 4A and 4B is illustrative and, in some other implementations, the controller may not include all of the components shown and/or may include additional components. Processor 462 may be a central processing unit (CPU) or other computing circuitry (e.g., a microcontroller, one or more application specific integrated circuits (ASICs), or the like) and may have one or more processing cores. Memory 464 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 464 may store instructions that, when executed by processor 462, cause processor 462 to perform the operations in connection with controller 460. Additionally, memory 464 may store one or more thresholds, data, preferences, or other settings. For example, memory 464 may store one or more rotational thresholds of first device 400a, second device 400b, or both.

Interfaces 466, such as wireless interfaces, may be configured to enable wireless communication between controller 460 and IHS 480, display 476, or both. In some implementations, wireless interfaces 466 include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, a non-LoRa interface, another type of network interface, or the like. I/O device 468 includes one or more switches (e.g., depressible buttons, triggers, or the like), one or more touchscreens, a microphone, a camera, one or more speakers, one or more light sources, vibration devices, or other types of devices that enable a user to receive information from or provide information to controller 460.

IHS 480 is configured to support and operate one or more electronic applications (e.g., 486), such as a video game, video streaming platform, music streaming platform, or other media platform. IHS 480 is referred to broadly and includes any suitable processor-based device such as, for example, video game console, a hand-held console, a desktop computer, a laptop computer, or a mobile computing device a tablet, a digital media or entertainment device, or another type of electronic device. IHS 480 may include at least a processor 482, a memory 484, and an interface 488 to enable communication with controller 460, and optionally with display 476. Processor 482 may be configured to execute instructions stored at memory 484 to cause IHS 480 to perform the operations described herein. In some implementations, IHS 480 can be configured to access a wireless network or the Internet (e.g., via an application on IHS 480) or to access a web application or web service hosted by a server, and thereby provide a user interface for enabling a user to access an application 486. In some configurations, IHS 480 is configured to act as an intermediary between controller 460 and display 476. For example, IHS 480 may receive a user input from controller 460 (e.g., at device 400*a*) and transmit and/or process the user input to display 476 to change the displayed environment (e.g., navigation between icons, rotating a point of view of a character, select a visual prompt, or otherwise changing the display environment). In some configurations, IHS 480 is configured to send instructions (e.g., signals) to controller 460 to transmit information to the user. For example, based on a programmable setting of application 486, IHS 480 may transmit one or more instructions to cause device 400*a*, device 400*b*, or both, to adjust a resistance of the resistance mechanisms (e.g., 430*a*, 430*b*). In some configurations, a user may transmit (e.g., via controller 460) a target resistance to IHS 480, which can then transmit one or more signals to controller 460 to adjust a resistance of one or more of the resistance mechanisms (e.g., 430*a*, 430*b*) to the target resistance. In some such configurations, the target resistance may be selected locally, for a single application (e.g., 486), or globally, for all applications (e.g., 486).

Additionally, or alternatively, application 486 may cause IHS 480 to transmit instructions to controller 460 to cause device 400*a*, device 400*b*, or both, to adjust a resistance of the resistance mechanisms (e.g., 430*a*, 430*b*). In an illustrative example, application 486 may allow a user to control a character in a gaming environment. When the character interacts with an obstacle (e.g., a wall), IHS 480 and application 486 can determine the movement of the character is hindered. Based on this determination, IHS 480 can transmit an adjust resistance signal to device 400*a*—which controls character movement—and the device 400*a* may adjust a resistance of a piezoelectric brake accordingly (e.g. adjusting the frequency and/or amplitude of an electrical signal applied to a piezoelectric element coupled to a brake). In this way, the user may be informed (e.g., via increased resistance of the joystick) quickly and accurately of the obstacle in a manner that is not possible with conventional controllers. The adjust resistance signal may also include information associated with a rotation direction of a joystick, a resistance intensity (e.g., resistance torque), or both. To illustrate, a first adjust resistance signal may be associated with a first direction (e.g., 102) and a high intensity. Based on receiving the first adjust resistance signal, device 400*a* may set the resistance of first resistance mechanism 430*a* to a target resistance associated with the high intensity for a rotational direction (e.g., clockwise) associated with the first direction (e.g., 102). In this way and others, system 402 and devices 400*a*, 400*b*, may enable application developers to include a more immersive experience by providing additional haptic feedback, such as vibration, shakes, or rumbles, to the users.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 5:
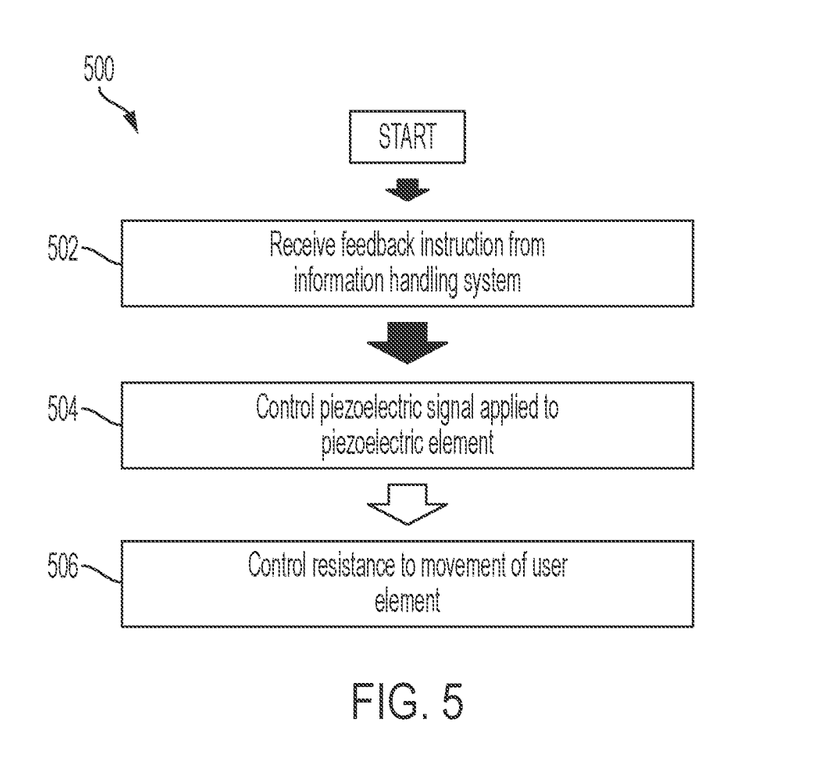
FIG. 5 illustrates a flow diagram of an example of a method of operating a user input device according to one or more aspects of the present disclosure.

Referring to FIG. 5, a method 500 of operating a user input device, such as device 100, 200, 400*a*, 400*b*, or the like, is shown. Method 500 may be performed at, by, or with device 100, 200, 400*a*, 400*b*, or one or more components thereof. Method 500 includes receiving feedback instruction from an IHS, at block 502. The IHS can include or correspond to a processor configured as a controller (e.g., processor 124, 462, 482, or the like), a memory configured to store one or more instructions that are executed by the processor (e.g., memory 136, 464, 484, or the like). The feedback instruction may include values for controlling a resistance of a joystick about one or more axes. The values can include or correspond to joystick position data (e.g., a relative distance between an active position and the default position), resistance data, game configuration data (e.g., data or instructions from an external gaming device), one or more thresholds such as positional thresholds, rotation thresholds, resistance thresholds, or combination thereof.

At blocks 504 and 506, method 500 further includes controlling a piezoelectric signal applied to a piezoelectric element of a resistance mechanism (e.g., 120, 220) coupled to the user element assembly (block 504) to control a resistance applied to a user element assembly (e.g., user element assembly 110, 210, 410*a*, 410*b*) as the user element assembly moves about an axis (e.g., 103) (block 506). To illustrate, a brake (e.g., 122, 226), such as a piezoelectric brake, may control the resistance applied to the user element assembly, as described above. For example, the brake may maintain or adjust the resistance based on a user input, an input from a computer application, dynamically based on events occurring in an application (such as feedback from events in a gaming application), or a combination thereof. In some configurations, the brake may control the resistance based on user element position data (e.g., a relative distance between an active position and the default position), resistance data, game configuration data, or the like. As a non-limiting example, a processor can receive an input associated with a target resistance and control the brake to operate at a target resistance torque that is linked to the target resistance. In a specific configuration, a processor may control an electrical current supplied to a piezoelectric element coupled to the brake to control the brake to operate at the target resistance.

Prior to the piezoelectric element control of blocks 502, 504, and 506, a force/resistance applied to the shaft by the piezoelectric element may be calibrated by adjusting, e.g., the adjustable element 244, to change the distance and/or applied force between the piezoelectric element 234 and the shaft 214, such as through the brake pad 226. This may be done, for example, during assembly of the user input device containing the piezoelectric brake by coupling a user element to a first end of a shaft; coupling a brake to a second end of the shaft; coupling a piezoelectric element to the brake, in which the piezoelectric element may be coupled to a controller and/or power supply such as through a PCB, coupling an adjustable element to user input device; and/or adjusting the adjustable element to apply at least a predetermined force to the PCB to compress the piezoelectric element against the brake.

Method 500 may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuity may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), or other optical disk storage, magnetic disk storage or other magnetic storage devices, or any other medium that can be used to store desired program code in the form of instructions or data structures and that can be accessed by a computer. Combinations of the above should also be included within the scope of computer-readable media. In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a shaft configured to couple at a first end to a user element, wherein the shaft terminates at a second end in a planar element; and
   a brake positioned between the planar element and
   a piezoelectric element coupled to the brake, wherein the piezoelectric element is configured to apply different forces to the brake to adjust a resistance to movement of the shaft.

2. The apparatus of claim 1, wherein the brake comprises a first side comprising an inset inner surface and an outer surface, wherein the planar element is in contact with the brake at the outer surface.

3. The apparatus of claim 2, wherein the inset inner surface comprises a larger portion of the first side of the brake than the outer surface.

4. The apparatus of claim 1, further comprising a printed circuit board (PCB) coupled to the piezoelectric element and configured to couple a power supply to the piezoelectric element.

5. The apparatus of claim 4, further comprising a processor coupled to the PCB and configured to control a signal applied to the piezoelectric element to adjust the resistance to movement of the shaft.

6. The apparatus of claim 5, wherein the processor is configured to adjust a frequency of a signal applied to the piezoelectric element to adjust the resistance to movement of the shaft.

7. The apparatus of claim 5, wherein the processor is configured to apply haptic feedback to the shaft by controlling the signal applied to the piezoelectric element.

8. The apparatus of claim 5, further comprising a sensor coupled to the PCB and coupled to the shaft, wherein the processor is configured to process a signal from the sensor corresponding to a movement of the shaft to determine user input.

9. The apparatus of claim 8, further comprising an adjustable element coupled to the PCB to apply a force to the PCB to compress the piezoelectric element against the brake.

10. The apparatus of claim 9, wherein the adjustable element comprises a screw.

11. The apparatus of claim 1, further comprising a housing and one or more isolators coupled to the housing.

12. A user input device, comprising:
   a housing defining a chamber configured to accommodate at least a portion of a first user element, wherein the first user element extends through the housing, and wherein the first user element comprises:
      a shaft having a first end extending through the housing and a second end terminating in a planar element; and
      a brake positioned between the planar element and
      a piezoelectric element coupled to the brake, wherein the piezoelectric element is configured to apply different forces to the brake to adjust a resistance to movement of the shaft; and
   a processor coupled to the first user element and configured to control a signal applied to the first user element to adjust the resistance to movement of the first user element.

13. The user input device of claim 12, wherein the first user element comprises a joystick, the device further comprising a second user element comprising at least one of a button, control stick, joystick, analog stick, thumb stick, trackball, or trigger.

14. The user input device of claim 13, wherein the second user element comprises:
   a second shaft terminating in a second planar element; and
   a second brake positioned between the second planar element and
   a second piezoelectric element coupled to the second brake, wherein the second piezoelectric element is configured to apply different forces to the second brake to adjust a resistance to movement of the second shaft.

15. The user input device of claim 14, further comprising an interface coupled to the processor, wherein the processor is configured to transmit user input received through the first user element and/or the second user element to an information handling system.

16. The user input device of claim 12, further comprising a PCB coupled to the piezoelectric element and an adjustable element coupled to the PCB to apply a force to the PCB to compress the piezoelectric element against the brake, wherein the adjustable element comprises a screw.

17. The user input device of claim 16, further comprising a sensor coupled to the PCB and coupled to the shaft, wherein the processor is configured to process a signal from the sensor corresponding to a movement of the shaft to determine user input.

18. The apparatus of claim 12, further comprising a housing and one or more isolators coupled to the housing.

19. A method of assembling a user input device, comprising:
   coupling a user element to a first end of a shaft;
   coupling a brake to a second end of the shaft;
   coupling a piezoelectric element to the brake;
   coupling a PCB to the piezoelectric element;
   coupling an adjustable element to the PCB; and
   adjusting the adjustable element to apply at least a predetermined force to the PCB to compress the piezoelectric element against the brake.

20. The method of claim 19, wherein the adjustable element comprises a screw, and wherein adjusting the adjustable element comprises rotating the screw to apply at least a predetermined force to the PCB to compress the piezoelectric element against the brake.

* * * * *